(12) United States Patent
Adamiecki et al.

(10) Patent No.: US 7,508,882 B2
(45) Date of Patent: Mar. 24, 2009

(54) ELECTRICAL BACKPLANE TRANSMISSION USING DUOBINARY SIGNALING

(75) Inventors: Andrew L. Adamiecki, Morganville, NJ (US); Jeffrey H. Sinsky, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1110 days.

(21) Appl. No.: 10/727,450

(22) Filed: Dec. 4, 2003

(65) Prior Publication Data

US 2005/0122954 A1  Jun. 9, 2005

(51) Int. Cl.
*H04L 25/34* (2006.01)
(52) U.S. Cl. .................. 375/291; 375/288; 375/296
(58) Field of Classification Search ............. 375/291, 375/288, 296; 333/167; 385/2; 341/169
See application file for complete search history.

(56) References Cited

U.S. PATENT DOCUMENTS

| | | | |
|---|---|---|---|
| 3,866,147 A | 2/1975 | De Couvreur et al. | 332/11 R |
| 4,086,566 A | 4/1978 | Lender | 340/146.1 |
| 4,860,310 A | 8/1989 | Lamnabhi et al. | 375/18 |
| 4,941,080 A | 7/1990 | Sieborger | 363/127 |
| 5,408,500 A * | 4/1995 | Ginzburg et al. | 375/288 |
| 5,412,691 A * | 5/1995 | Ginzburg et al. | 375/296 |
| 5,640,605 A | 6/1997 | Johnson et al. | 395/881 |
| 5,664,108 A | 9/1997 | Heaton et al. | 395/200.82 |
| 5,892,858 A * | 4/1999 | Vaziri et al. | 385/2 |
| 6,480,405 B2 | 11/2002 | Gharpurey | 363/127 |
| 6,734,759 B2 * | 5/2004 | Humann | 333/167 |
| 2005/0024253 A1 * | 2/2005 | Adamiecki et al. | 341/169 |

FOREIGN PATENT DOCUMENTS

| | | |
|---|---|---|
| EP | 0 304 081 A | 2/1989 |
| EP | 0 369 159 A | 5/1990 |
| EP | 0 551 858 A2 | 7/1993 |
| GB | 2 217 957 | 11/1989 |
| GB | 2 217 957 A | 11/1989 |

OTHER PUBLICATIONS

"Extended 10 Gb/s Fiber Transmission Distance at 1538 nm Using a Duobinary Receiver," by G. May et al., IEEE Photonics Technology Letters, IEEE Inc. New York, US, vol. 6, No. 5, May 1, 1994, pp. 648-650.

(Continued)

*Primary Examiner*—Sudhanshu C Pathak

(57) ABSTRACT

A (binary) signal is transmitted through an electrical backplane, and the received signal is interpreted as a duobinary signal. In order to ensure that the received signal can be properly interpreted as a duobinary signal, the data signal is preferably filtered prior to being interpreted. The filter is preferably designed such that the combination of filter and the backplane approximates a binary-to-duobinary converter. In one embodiment, an (FIR-based) equalizing filter is applied to the data signal prior to transmission to emphasize the high-frequency components and flatten the group delay of the backplane. The resulting, received duobinary signal is converted into a binary signal by (1) splitting the duobinary signal, (2) applying each copy to a suitably thresholded comparator, and (3) applying the comparator outputs to a suitable (e.g., XOR) logic gate. The transmission system enables high-speed data (e.g., greater than 10 Gb/s) to be transmitted over relatively inexpensive electrical backplanes.

29 Claims, 5 Drawing Sheets

OTHER PUBLICATIONS

"The Duobinary Technique for High-Speed Data Transmission," by Adam Lender, IEEE Trans. On Communication and Electronics, vol. 82, May 1963, pp. 214-218.

"Wide-Band Symmetrical Analog Multiplier IC for Coherent Optical-Fiber Receivers Operating up to 10Gb/s," by Hans-Martin Rein et al., IEEE Journal of Solid-State Circuits, vol. 26, No. 12, Dec. 1991, pp. 1840-1846.

"Digital Transmission Systems", by David R. Smith, Van Nostrand Reinhold 1985, 576p., Jun. 1985, ISBN: 0-534-03382-2, pp. 212-217.

"Wreslemania: Keeping High-Speed Backplane Design Under Control," by Nicholas Cravotta, EDN, 'Online!, Aug 22, 2002, 238.418, pp. 34-46, XP002336023.

"Engineering Of The Duobinary Repeatered Line," by A. Lender et al., International Conference On Communications, Chicago, New York, IEEE, US, vol. 2, Jun. 1977, pp. 32.4-306-32.4-309, XP000794566.

"Duobinary Transmission Over ATCA Backplanes," by Majid Barazande-Pour and John Khoury, IEEE 802.3ap, Backplane Ethernet Task Force Plenary Meeting, Nov. 15-19, 2004, San Antonio, Texas, pp. 1-24, XP002335947.

"10-Gb/s Electrical Backplane Transmission using Doubinary Signaling," Jeffrey H. Sinsky et al., IEEE MTT-S Digest, Piscataway, NJ, vol. 1, Jun. 6, 2004, pp. 109-112, XP010727233.

\* cited by examiner

ELECTRICAL BACKPLANE TRANSMISSION USING DUOBINARY SIGNALING

BACKGROUND OF THE INVENTION

1. Field of the Invention

The invention relates to signal processing, and, in particular, to the transmission of (e.g., GHz-speed) data through electrical backplanes.

2. Description of the Related Art

Gigahertz-speed data rates are required in core optical products such as high-speed routers and cross-connect switches. Many such large-scale systems require the routing of hundreds to thousands of signals in a small area using little power and for low cost. Typically, this routing occurs on a multi-layer board called a high-speed backplane. Maintaining signal integrity for gigahertz-speed line rates on this structure is very difficult, and has resulted in an important field of study. There are several approaches being pursued by many vendors to maintain backplane signal transmission integrity. These techniques fall into basically two categories: passive and active.

Passive solutions incorporate the use of high-quality microwave substrate materials, innovative via hole techniques, and new connector technology. While these techniques can help address the transmission problem, the use of costly microwave substrates and special high-bandwidth backplane connectors are often required. Moreover, very long trace lengths may still result in less-than-acceptable transmission characteristics.

Active solutions include adaptive equalization, pre-emphasis, PAM-4, and combinations thereof. Although these solutions can provide excellent performance even for long trace lengths, power consumption and cost can be issues. Typically, active solutions that provide equalization or pre-emphasis must correct the entire NRZ data bandwidth. The problem is that, for many low-quality transmission systems, the frequency-response roll-off is severe, and the use of via holes on thick backplanes results in nulls in the frequency range of interest. Equalization or pre-emphasis through nulls requires the use of higher-order networks, and the resulting correction will be very sensitive to temperature and parameter variations.

One solution to the problem of poor high-frequency response is to compress the bandwidth using multi-level coding. PAM-4 is currently being used with equalization by some vendors to address this problem. Although this technique has been shown to provide very good performance even over long traces, these circuits are typically complex, leading to difficulty providing dense integration and significantly increased power consumption relative to standard NRZ signaling.

SUMMARY OF THE INVENTION

Problems in the prior art are addressed in accordance with the principles of the invention by using electrical duobinary signaling for electrical backplanes to provide both bandwidth reduction and simplification of implementation suitable for high-scale integration. The idea behind the duobinary signaling architecture of the present invention is to reshape the complex data spectrum from the transmitter such that the resulting waveform available at the receiver after traveling through an electrical backplane is a duobinary signal.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIG. 2b shows a block diagram of a possible IC implementation of a particular fixed implementation of the two-tap FIR pre-emphasis filter of FIG. 2a;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

System Concept

Figure 1:
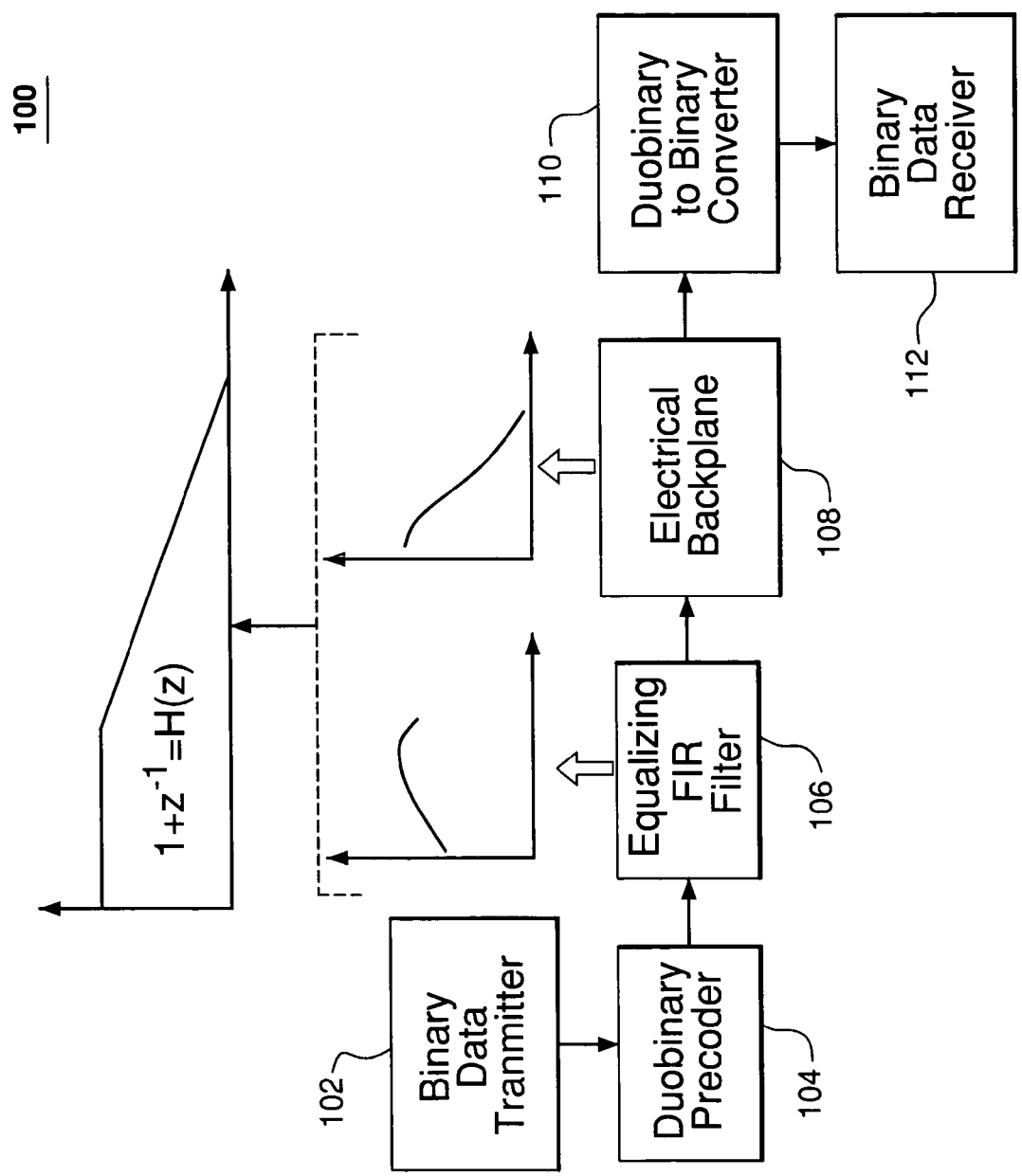
FIG. 1 shows a block diagram of a transmission system, according to one embodiment of the present invention.

FIG. 1 shows a block diagram of a transmission system 100, according to one embodiment of the present invention. Binary data transmitter 102 provides a non-return-to-zero (NRZ) binary data stream to be transmitted through a (e.g., low-cost) electrical backplane (108). Duobinary precoder 104 manipulates data bits in the NRZ binary data stream so that, at the receiver, an error in a given bit is not dependent on the previous bit, as described in *Digital Transmission Systems*, by David R. Smith, Van Nostrand Reinhold 1985, pp.212-217, the teachings of which are incorporated herein by reference.

Equalizing filter 106 reshapes both the amplitude and phase of the complex spectrum of the signal prior to being transmitted through electrical backplane 108. Equalizing filter 106 is designed such that the combination of filter 106 and backplane 108 effectively operates as a binary-to-duobinary converter. In other words, when an NRZ binary data signal is filtered by equalizing filter 106 and then transmitted through electrical backplane 108, the resulting signal (presented to duobinary-to-binary converter 110) looks like a duobinary data signal corresponding to the original NRZ binary data signal.

Duobinary signaling encodes data using three signal levels, for example, "+1", "0", and "-1". A signal corresponding to one of these levels (i.e., a duobinary symbol) is transmitted during each signaling interval (time slot). A duobinary signal is typically generated from a corresponding binary signal using certain transformation rules. Although both signals carry the same information, the bandwidth of the duobinary signal may be reduced by a factor of two compared to that of the binary signal at the expense of signal-to-noise ratio.

A number of different transformations have been proposed for constructing a duobinary sequence, $b_k$, from a corresponding binary sequence, $a_k$, where $k=1, 2, 3, \ldots$ According to one such transformation, for any particular k=m, when $a_m=0$, $b_m=0$. When $a_m=1$, $b_m$ equals either +1 or −1, with the polarity of $b_m$ determined based on the polarity of last non-zero symbol $b_{m-i}$ preceding $b_m$, where i is a positive integer. More specifically, when i is odd, the polarity of $b_m$ is the same as the polarity of $b_{m-i}$; and, when i is even, the polarity of $b_m$ is the opposite of the polarity of $b_{m-i}$. Due to the properties of this transformation, the duobinary sequence has no transitions between the "+1" and "−1" levels in successive time slots. Only transitions between (i) "0" and "+1" and (ii) "0" and "−1" levels can occur. Reconstruction of $a_k$ from a known $b_k$ is relatively straightforward. More specifically, when $b_m=\pm 1$, $a_m=1$; and, when $b_m=0$, $a_m=0$.

The transfer function $H_{B/D}$ of an ideal binary-to-duobinary (B/D) converter is represented by the Z-transform $1+z^{-1}$ or, equivalently, by the Fourier transform $(1+e^{-j\omega T})$, where T is the bit period. In order for the combination of equalizing filter 106 and electrical backplane 108 to operate as a B/D converter, the product of the transfer function $H_{FIR}$ of equalizing filter 106 and the transfer function $H_B$ of electrical backplane 108 should sufficiently approximate the ideal B/D transfer function $H_{B/D}$.

A typical low-cost electrical backplane has a frequency roll-off that is much steeper than that of an ideal B/D converter. As a result, as indicated in the graphical portions of FIG. 1, equalizing filter 106 is preferably designed to emphasize the higher-frequency components of the duobinary signal as well as flatten the group-delay response across the band. The resulting combined response of equalizing filter 106 and electrical backplane 108, also shown in FIG. 1, approximates a Bessel low-pass filter at about one quarter bit rate.

Since the duobinary data spectrum has a null at one half the bit rate, the amount of high-frequency emphasis is greatly reduced when compared to emphasizing uncoded NRZ data. Additionally, nulls that occur in the transfer function of the backplane as a result of via-hole resonances typically become more predominant towards the higher end of the frequency spectrum with current backplanes and 10 Gb/s transmission. As such, the fact that the spectral components of concern are below half the bit rate provides a significant advantage.

After the filtered signal is transmitted through electrical backplane 108, duobinary-to-binary (D/B) converter 110 converts the resulting, received duobinary signal back into an NRZ binary signal that is then further processed (e.g., decoded) at binary data receiver 112.

Although equalizing filter 106 is preferably implemented using a finite impulse response (FIR) filter, any other suitable filter implementation could also be used. Moreover, although equalizing filter 106 is shown in FIG. 1 as being implemented before the signal is transmitted through electrical backplane 108, an equalizing filter could be applied after transmission through electrical backplane 108, either instead of or in addition to equalizing filter 106.

In transmission system 100, binary data transmitter 102, duobinary precoder 104, and equalizing filter 106 may be said to be components of a transmitter subsystem of the transmission system, while D/B converter 110 and binary data receiver 112 may be said to be components of a receiver subsystem of the transmission system, where electrical backplane 108 forms the signal transmission path between the transmitter subsystem and the receiver subsystem.

Synthesis of the Duobinary Equalizing Filter

Equalizing filter 106 preferably reshapes both the amplitude and phase of the complex data spectrum so that the data presented to duobinary-to-binary converter 110 is in fact duobinary data. This can be accomplished using a filter that emphasizes the high-frequency components and flattens the group delay of the backplane. In general, the frequency response $H_{FIR}(\omega)$ of an FIR filter implementation will have the form given by Equation (1) as follows:

$$H_{FIR}(\omega) = \sum_{q=0}^{N} c_q e^{-jq\omega T}, \qquad (1)$$

where $C_q$ are the filter tap coefficients, T is the bit period, and $\omega$ is the angular frequency. If $H_B(\omega)$ is the complex frequency response of electrical backplane 108, then the filter response $H_{FIR}(\omega)$ is given by Equation (2) as follows:

$$H_{FIR}(\omega) = \frac{H_{B/D}(\omega)}{H_B(\omega)}, \qquad (2)$$

where the combined response $H_{B/D}(\omega)$ of the filter and the backplane is ideally the frequency response of a binary-to-duobinary converter $(1+e^{-j\omega T})$, which can be implemented as a delay-and-add filter with a Z-transform of $1+z^{-1}$.

In general, the use of Equation (2) may result in a filter that has many coefficients. For a high-speed, discrete-time implementation, this is not desirable. Instead, the $L_p$ norm is used to carry out the following optimization of Expression (3) to obtain the filter response $H_{FIR}(\omega)$:

$$\min_{C,K,\tau_c} \left[ \int_0^{\omega_{\max}} |e_1(\omega, C, K)|^p + |e_2(\omega, C, \tau_c)|^p d\omega \right]^{1/p}, \qquad (3)$$

where:

$e_1(\omega,C,K)=\log|H_{B/D}(\omega)|-K\log|H_B(\omega)H_{FIR}(C,\omega)|$, $e_2(\omega,C,\tau_c)=\angle[H_{B/D}(\omega)]-\tau_c\omega-\angle[H_B(\omega)H_{FIR}(C,\omega)]$, K is a scalar constant, $\tau_c$ is a group delay constant, $C=[c_0, c_1, \ldots, c_N]$ are the coefficients of the FIR filter, p is a positive even integer, and $\angle X$ represents the argument of the complex function X (i.e., the angle between the complex function and the real axis). Implementing equalizing filter 106 using a discrete-time FIR filter placed at the data transmitter can accomplish this task using a minimal number of gates and analog functionality.

Figure 2A:
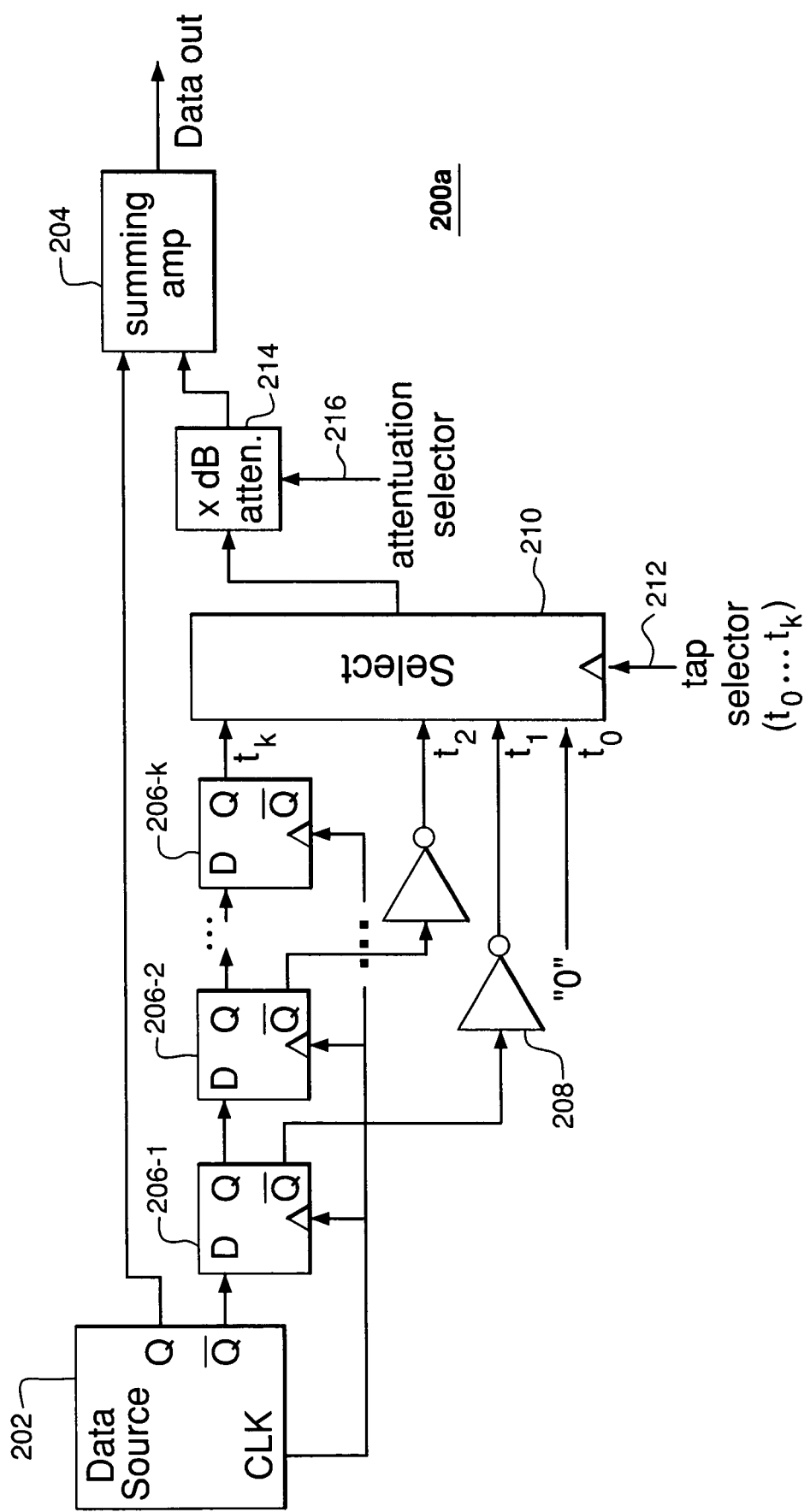
FIG. 2a shows a block diagram of a generalized, two-tap FIR pre-emphasis filter that can be used for the equalizing filter of FIG. 1, according to one embodiment of the present invention.

FIG. 2a shows a block diagram of a generalized, two-tap FIR pre-emphasis filter 200a, which can be used for equalizing filter 106 of FIG. 1, according to one embodiment of the present invention. Although this is not the most general formulation for equalizing filter 106, it is believed to be adequate for most cases, while providing simplicity. In other implementations, for example, the filter could have more than two taps.

In particular, data source (e.g., flip-flop) 202 provides the input signal to summing amp 204 as well as providing the inverted input signal to a series of delays (e.g., flip-flops) 206 that delay the signal. Except for the last delay (206k) in the series, the inverted output $\overline{Q}$ of each delay 206 is applied to a different inverter 208 to generate an input to selector 210, which also receives the delayed inverted data stream from last delay 206k.

Selector 210 selects one of its inputs based on a tap selector control signal 212. The selected input is applied to attenuator 214, which attenuates the selected input based on an attenuation selector control signal 216. The resulting attenuated value is added to the original data stream at summing amp 204 to generate the pre-emphasized output signal.

Tap selector control signal 212 can select any one of the inputs $t_0, \ldots, t_k$, where $t_0$ corresponds to a "no pre-emphasis" selection. In general, tap $t_i$ provides a delay of $i \times T$, where T is the bit period. The delay selected by selector 210 depends on the impulse response of the channel.

In this way, FIR pre-emphasis filter 200a can add a delayed-and-scaled replica of the original signal to the original signal, so as to realize the response from Equation (1). Note that an inverting amplifier is not needed to realize a minus sign in Equation (1) for negative filter coefficients. Since the input data is purely digital at this point in the system, the inverted data stream can be used to accomplish the same effect. Depending on the implementation, the FIR filter may be adaptive or it may have fixed tap delays and amplitudes.

Figure 2B:
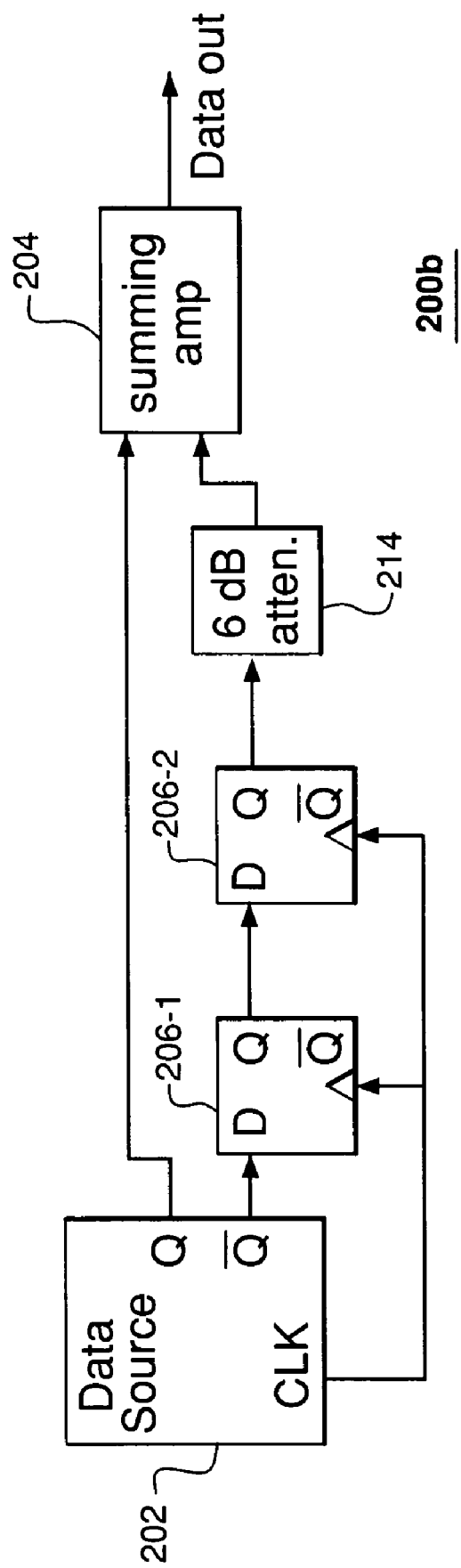

FIG. 2b shows a block diagram of a possible IC implementation of a particular fixed implementation of the two-tap FIR pre-emphasis filter of FIG. 2a for a particular electrical backplane. Filter 200b comprises data source (flip-flop) 202, summing amp 204, delays 206-1 and 206-2, and 6-dB attenuator 214. As indicated in FIG. 2b, the inverted data signal is delayed at delays 206 and attenuated at attenuator 214 before being added to the original data signal at summing amp 204 to generate the filtered signal. Filters for other electrical backplanes could have different numbers of delays and/or taps and/or different levels of attenuation.

Duobinary-to-Binary Converters

Figures 3, 4:
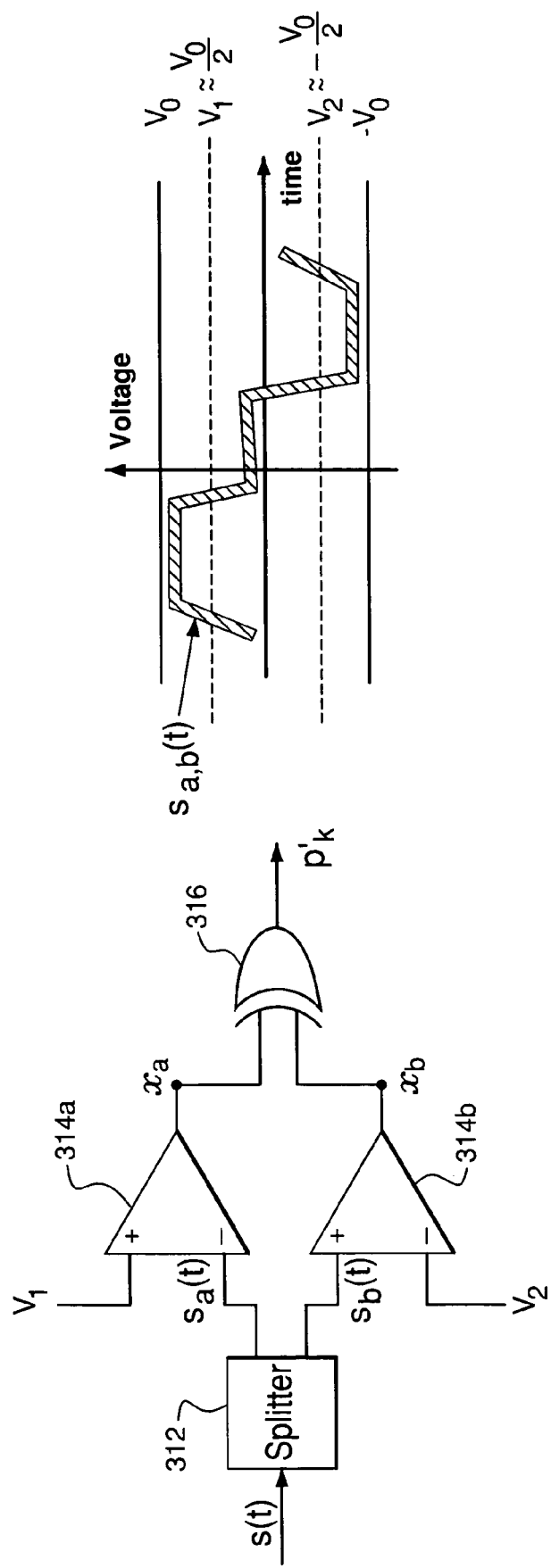
FIG. 3 shows a block diagram of a duobinary-to-binary (D/B) converter that can be used for the D/B converter of FIG. 1, according to one embodiment of the present invention.
FIG. 4 graphically illustrates one exemplary configuration of the D/B converter of FIG. 3.

FIG. 3 shows a block diagram of duobinary-to-binary converter 308, which can be used for D/B converter 110 of FIG. 1, according to one embodiment of the present invention. This implementation of a D/B converter is described in further detail in U.S. patent application Ser. No. 10/630,422, filed on Jul. 30, 2003 as Adamiecki 2-6, the teachings of which are incorporated herein by reference. When implemented in hardware, converter 308 can be realized using a balanced-input, exclusive-OR gate, where the thresholds are set appropriately. Converter 308 performs relatively well at or above about 10 Gb/s and, at the same time, may be relatively small and inexpensive to implement. In addition, converter 308 can be adapted in a relatively straightforward fashion to work at even higher bit rates and lends itself to relatively easy incorporation into an integrated device (e.g., an ASIC) for transmission system 100 of FIG. 1.

As shown in FIG. 3, duobinary input signal s(t) applied to converter 308 is divided into two signal copies, $s_a(t)$ and $s_b(t)$, using a wideband splitter 312 preferably having a bandwidth of about $1/(2T_b)$, where $T_b$ is the bit period of original binary input stream. Copy $s_a(t)$ is applied to the inverting input of a first comparator 314a, whose non-inverting input receives a first threshold voltage $V_1$. Similarly, copy $s_b(t)$ is applied to the non-inverting input of a second comparator 314b, whose inverting input receives a second threshold voltage $V_2$. The output x of each comparator 314 is a digital signal generated as follows. When $V_- \geq V_+$, x=0; and, when $V_- < V_+$, x=1, where $V_-$ and $V_+$ are the voltages applied to the inverting and non-inverting inputs, respectively, of the comparator.

The output of each comparator 314 is applied to an exclusive-OR (XOR) gate 316, which generates binary output sequence $p_k'$. Each of comparator 314a, comparator 314b, and XOR gate 316 preferably has a bandwidth of about $1/T_b$.

FIG. 4 graphically illustrates one exemplary configuration of converter 308. More specifically, threshold voltages $V_1$ and $V_2$ are set at the values of about $V_0/2$ and $-V_0/2$, where $V_0$ is a voltage corresponding to the maximum duobinary signal levels in signal copies $s_a(t)$ and $s_b(t)$. The signal trace shown in FIG. 4 from left to right corresponds to a duobinary sequence of "+1, 0, −1".

Table I illustrates the operation of converter 308 configured in accordance with FIG. 4. As indicated in Table I, so-configured converter 308 will correctly convert the signal shown in FIG. 4 into a binary sequence of "101".

TABLE I

D/B Converter Truth Table

| Condition | $x_a$ | $x_b$ | $p_k'$ |
|---|---|---|---|
| $s > V_1$ | 0 | 1 | 1 |
| $V_1 > s > 0$ | 1 | 1 | 0 |
| $0 > s > V_2$ | 1 | 1 | 0 |
| $V_2 > s$ | 1 | 0 | 1 |

Figure 5:
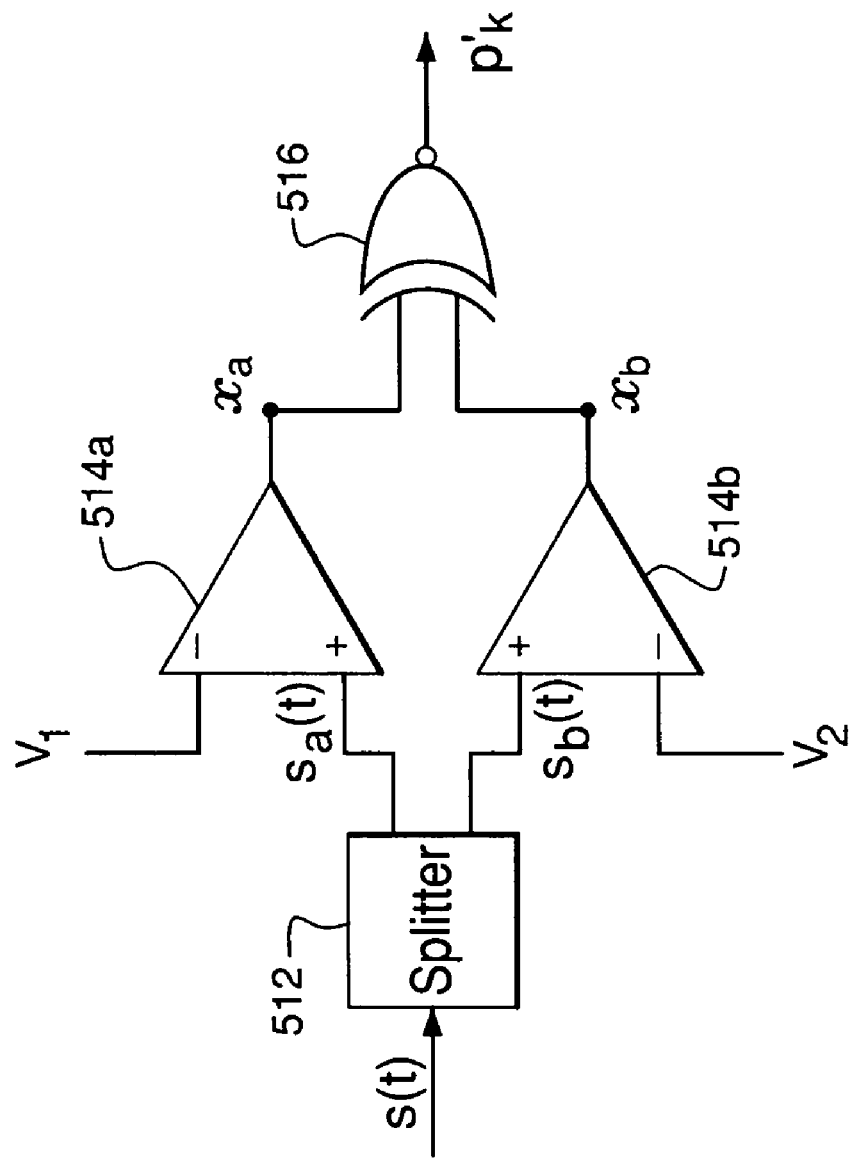
FIG. 5 shows a block diagram of a D/B converter that which can be used as the D/B converter in FIG. 1, according to another embodiment of the present invention.

FIG. 5 shows a block diagram of a D/B converter 508, which can be used as D/B converter 110 in FIG. 1, according to another embodiment of the present invention. Converter 508 is similar to converter 308 of FIG. 3 and includes a wideband splitter 512, two comparators 514a-b, and a logic gate 516. One difference between converters 508 and 308, is that, in converter 508, signal copy $s_a(t)$ is applied to the non-inverting input of comparator 514a, and threshold voltage $V_1$ is applied to the inverting input of comparator 514a. In order to provide the correct output data, logic gate 516 of D/B converter is an exclusive-NOR (XNOR) gate.

Table II illustrates the operation of converter 508, when configured in accordance with FIG. 4. As indicated in Table II, like converter 308 of FIG. 3, converter 508 will also correctly convert the signal shown in FIG. 4 into a binary sequence of "101".

TABLE II

D/B Converter Truth Table

| Condition | $x_a$ | $x_b$ | $p_k'$ |
|---|---|---|---|
| $s > V_1$ | 1 | 1 | 1 |
| $V_1 > s > 0$ | 0 | 1 | 0 |
| $0 > s > V_2$ | 0 | 1 | 0 |
| $V_2 > s$ | 0 | 0 | 1 |

Advantageously, D/B converters of the present invention adapted for relatively high bit rates do not require complex microwave-matching circuits as do prior-art D/B converters. Furthermore, the inventors' own research demonstrated that a D/B converter of the present invention embodied in an indium-phosphate-based integrated circuit (i) was robust and relatively inexpensive and (ii) should perform relatively well with bit rates as high as 40 Gb/s.

The present invention provides backwards compatibility for certain applications in which the binary data rate is one-fourth or less than the duobinary data rate. For example, an embodiment capable of processing 10-Gb/s duobinary signals can be configured to process 2.5-Gb/s (or lower) NRZ binary signals by appropriately setting the threshold voltage levels $V_1$ and $V_2$ of the D/B converter.

One possible configuration is to set $V_1 \cong 0$ and $V_2 \cong V_0$. In this configuration, the output of comparator 314b of FIG. 3 is always zero. Another possible configuration is to set $V_1 \cong 0$ and $V_2 \cong -V_0$. In this configuration, the output of comparator 314b is always one. Yet another possible configuration is to set $V_1 \cong -V_0$ and $V_2 \cong 0$. In this configuration, the output of comparator 314a of FIG. 3 is always zero. Still another possible configuration is to set $V_1 \cong V_0$ and $V_2 \cong 0$. In this configuration, the output of comparator 314a is always one. Each of these configurations effectively turns off one of the comparators of FIG. 3, thereby enabling D/B converter 308 to operate as a single-threshold binary receiver.

While this invention has been described with reference to illustrative embodiments, this description is not intended to be construed in a limiting sense. The present invention can implemented for either analog or digital signal processing. Data sequences may be represented by non-return-to-zero (NRZ) or return-to-zero (RZ) signals. D/B converters of the present invention may be based on a pair of comparators whose configuration may be differently and appropriately selected. A logic gate may be implemented as a combination of suitable logic elements as known in the art. For example, XNOR gate 516 of FIG. 5 may be implemented as an XOR gate followed by an inverter. Although the present invention can be implemented for data rates of about 10 Gb/s, the present invention may similarly be designed to operate at other selected bit rates, either higher or lower than 10 Gb/s.

The present invention has been described in the context of a transmission system having a duobinary precoder, an equalizing (pre-emphasis) filter before the electrical backplane, and a duobinary-to-binary converter after the electrical backplane. The invention is not so limited. Depending on the particular application the duobinary precoder could be optional. Similarly, as previously mentioned, an equalizing (post-emphasis) filter could be implemented after the electrical backplane in addition to or instead of the pre-emphasis filter. Moreover, in applications in which the transfer function of the electrical backplane by itself sufficiently approximates that of a binary-to-duobinary converter, the transmission system could, in theory, be implemented without any equalizing filtering, either before or after the backplane. Furthermore, there may be applications in which the resulting duobinary signal does not need to be converted back to a binary signal. In that case, the transmission system could, in theory, be implemented without a D/B converter.

As used in this specification, the term "electrical backplane" can in general refer to any of the electrical paths between two or more different computers, between two or more different circuit boards within a computer or other digital electronic equipment, or even between two or more different modules within a single circuit board.

Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A method for processing signals in a transmission system having a transmitter subsystem connected to a receiver subsystem by an electrical backplane, wherein the electrical backplane receives a transmitted data signal from the transmitter subsystem and provides a received data signal to the receiver subsystem, the method comprising:
   in the transmitter subsystem:
      providing a final binary data signal; and
      processing the final binary data signal to provide the transmitted data signal to the electrical backplane; and
   in the receiver subsystem:
      receiving the received data signal form the electrical backplane; and
      processing the received data signal as a duobinary data signal, wherein:
         the transmission system comprises at least one filter located in at least one of the transmitter subsystem and the receiver subsystem;
         the transfer function property of the combination of the electrical backplane and the at least one filter corresponds to the transfer function property of a binary-to-duobinary converter; and
         after providing the final binary data signal, no duobinary data signal exists in the transmitter subsystem.

2. The invention of claim 1, wherein the final binary data signal is a precoded binary data signal.

3. The invention of claim 1, further comprising filtering using the at least one filter after providing the final binary data signal and prior to processing the received data signal as the duobinary data signal.

4. The invention of claim 3, wherein:
   the at least one filter is located in the transmitter subsystem; and
   in the transmitter subsystem, the processing comprises filtering the final binary data signal using the at least one filter.

5. The invention of claim 3, wherein the filtering comprises equalizing filtering.

6. The invention of claim 3, wherein the filtering is designed to emphasize high-frequency components and flatten group delay of the electrical backplane.

7. The invention of claim 3, wherein the filtering is implemented using an FIR filter.

8. The invention of claim 3, wherein the filtering:
   delays a first copy of the filtered data signal;
   attenuates the delayed first copy; and
   adds the attenuated, delayed first copy to a second copy of the filtered data signal.

9. The invention of claim 3, wherein the combination of the filtering and the transmission through the electrical backplane approximates binary-to-duobinary conversion.

10. The invention of claim 1, wherein duobinary-to-binary (D/B) conversion is applied to the received data signal to generate an output binary data signal.

11. The invention of claim 10, wherein the D/B conversion comprises:
   comparing amplitude of the received data signal with first and second threshold voltages to generate first and second binary streams; and
   applying a logic function to the first and second binary streams to generate the output binary data signal.

12. The invention of claim 11, wherein the logic function comprises an exclusive-OR (XOR) function.

13. The invention of claim 11, wherein the logic function comprises an exclusive-NOR (XNOR) function.

14. The invention of claim 11, wherein:
   the output binary data signal in an NRZ binary data signal; and
   the first and second threshold voltages are selected such that one of the first and secondary binary streams is always zero or always one.

15. The invention of claim 1, wherein the electrical backplane comprises a multi-layer board.

16. The invention of claim 1, wherein:
the final binary data signal is a precoded binary data signal;
filtering is performed using the at least one filter after providing the final binary data signal and prior to processing the received data signal as the duobinary data signal; and
duobinary-to-binary (D/B) conversion is applied to the received data signal to generate an output binary data signal.

17. The invention of claim 16, wherein:
the combination of the filtering and the transmission through the electrical backplane approximates binary-to-duobinary conversion; and
the duobinary-to-binary conversion comprises:
comparing amplitude of the received data signal with first and second threshold voltages to generate first and second binary streams; and
applying a logic function to the first and second binary streams to generate the output binary data signal.

18. A transmission system comprising:
a transmitter subsystem; and
a receiver subsystem connected to the transmitter subsystem by an electrical backplane, wherein the electrical backplane receives a transmitted data signal from the transmitter subsystem and provides a received data signal to the receiver subsystem, wherein:
the transmitter subsystem is adapted to:
provide a final binary data signal; and
process the final binary data signal to provide the transmitted data signal to the electrical backplane; and
the receiver subsystem is adapted to:
receive the received data signal from the electrical backplane; and
process the received data signal as a duobinary data signal, wherein:
the transmission system comprises at least one filter located in at least one of the transmitter subsystem and the receiver subsystem;
the transfer function property of the combination of the electrical backplane and the at least one filter corresponds to the transfer function property of a binary-to-duobinary converter; and
after providing the final binary data signal, no duobinary data signal exists in the transmitter subsystem.

19. The invention of claim 18, wherein the at least one filter is adapted to filter after the final binary data signal is provided and prior to the received data signal being processed as the duobinary data signal.

20. The invention of claim 19, wherein the at least one filter is designed to emphasize high-frequency components and flatten group delay of the electrical backplane.

21. The invention of claim 19, wherein the at least one filter comprises:
one or more delays adapted to delay a first copy of the filtered data signal;
an attenuator adapted to attenuate the delayed first copy; and
a summing node adapted to add the attenuated, delayed first copy to a second copy of the filtered data signal.

22. The invention of claim 21, wherein the at least one filter further comprises a selector connected to receive an output from each of a plurality of delays and adapted to select one of the delay outputs as the signal applied to the attenuator.

23. The invention of claim 19, wherein the combination of the at least one filter and the electrical backplane approximates a binary-to-duobinary converter.

24. The invention of claim 18, wherein the receiver subsystem comprises a duobinary-to-binary (D/B) converter adapted to apply duobinary-to-binary conversion to the received data signal to generate an output binary data signal.

25. The invention of claim 24, wherein the D/B converter comprises:
a splitter adapted to split the received data signal;
two comparators, each adapted to compare a copy of the received data signal to a specified threshold voltage; and
a logic gate adapted to generate the output binary data signal from outputs from the two comparators.

26. The invention of claim 25, wherein:
the output binary data signal is an NRZ binary data signal; and
the threshold voltages for the two comparators are selected such that one of the comparator outputs is always zero or always one.

27. The invention of claim 18, wherein:
the transmitter subsystem comprises a precoder adapted to provide the final binary data signal as a precoded binary data signal;
the at least on filter is adapted to perform filtering after the final binary data signal is provided and prior to the received data signal being processed as the duobinary data signal; and
the receiver subsystem comprises a duobinary-to-binary converter adapted to apply duobinary-to-binary conversion to the received data signal to generate an output binary data signal.

28. The invention of claim 27, wherein:
the combination of the at least one filter and the electrical backplane approximates a binary-to-duobinary converter; and
the duobinary-to-binary converter comprises:
a splitter adapted to split the received data signal;
two comparators, each adapted to compare a copy of the received data signal to a specified threshold voltage; and
a logic gate adapted to generate the output binary data signal form outputs from the two comparators.

29. Apparatus for processing signals in a transmission system having a transmitter subsystem connected to a receiver subsystem by an electrical backplane, wherein the electrical backplane receives a transmitted data signal from the transmitter subsystem and provides a received data signal to the receiver subsystem, the apparatus comprising:
in the transmitter subsystem:
means for providing a final binary data signal; and
means for processing the final binary data signal to provide the transmitted data signal to the electrical backplane; and
in the receiver subsystem:
means for receiving the received data signal from the electrical backplane; and
means for processing the received data signal as a duobinary data signal, wherein:
the transmission system comprises at least one filter located in at least one of the transmitter subsystem and the receiver subsystem;
the transfer function property of the combination of the electrical backplane and the at least one filter corresponds to the transfer function property of a binary-to-duobinary converter; and
after providing the final binary data signal, no duobinary data signal exists in the transmitter subsystem.

* * * * *